United States Patent
Nakami et al.

(10) Patent No.: US 7,301,566 B2
(45) Date of Patent: Nov. 27, 2007

(54) ADJUSTMENT FOR OUTPUT IMAGE OF IMAGE DATA

(75) Inventors: Yoshihiro Nakami, Nagano-ken (JP); Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 837 days.

(21) Appl. No.: 10/618,104

(22) Filed: Jul. 11, 2003

(65) Prior Publication Data

US 2005/0024522 A1 Feb. 3, 2005

(51) Int. Cl.
*H04N 5/235* (2006.01)
*H04N 5/228* (2006.01)

(52) U.S. Cl. .................... 348/222.1; 348/362
(58) Field of Classification Search ........ 348/362–365, 348/222.1
See application file for complete search history.

(56) References Cited

U.S. PATENT DOCUMENTS

| | | | |
|---|---|---|---|
| 6,011,547 A | | 1/2000 | Shiota et al. |
| 2002/0167592 A1* | | 11/2002 | Toyoda et al. ............ 348/222.1 |
| 2003/0174886 A1* | | 9/2003 | Iguchi et al. ................ 382/167 |
| 2003/0218687 A1* | | 11/2003 | Sato ............................ 348/362 |

FOREIGN PATENT DOCUMENTS

| | | |
|---|---|---|
| JP | 10-191246 | 7/1998 |
| JP | 2000-261719 | 9/2000 |
| JP | 2001-186297 | 7/2001 |
| JP | 2001-243463 | 9/2001 |
| JP | 2002-232728 | 8/2002 |

OTHER PUBLICATIONS

Abstract of Japanese Patent Publication No. 10-191246, Pub. Date: Jul. 21, 1998, Patent Abstracts of Japan.
Abstract of Japanese Patent Publication No. 2000-261719, Pub. Date: Sep. 22, 2000, Patent Abstracts of Japan.
Abstract of Japanese Patent Publication No. 2001-186297, Pub. Date: Jul. 6, 2001, Patent Abstracts of Japan.
Abstract of Japanese Patent Publication No. 2001-243463, Pub. Date: Sep. 7, 2001, Patent Abstracts of Japan.
Abstract of Japanese Patent Publication No. 2002-232728, Pub. Date: Aug. 16, 2002, Patent Abstracts of Japan.

* cited by examiner

*Primary Examiner*—Lin Ye
*Assistant Examiner*—Gevell Selby
(74) *Attorney, Agent, or Firm*—Martine Penilla & Gencarella, LLP

(57) ABSTRACT

In case where photo information PI (Exif IFD) is included in image data GF, a CPU calculates a modified contrast correction amount tCurve_cont and a modified brightness value correction amount tCurve_Y, in consideration of an exposure correction amount (a light exposure) EV. The CPU applies the obtained modified contrast correction amount tCurve_cont and the modified brightness value correction amount tCurve_Y to a tone curve, and executes an adjustment of image quality including contrast and brightness value. In other words, the CPU modifies characteristics of the tone curve by using the modified contrast correction amount tCurve_cont and the modified brightness value correction amount tCurve_Y, and adjusts the image quality of the image data by applying the modified tone curve to the image data GD.

19 Claims, 9 Drawing Sheets

| Exposure correction amount | Contrast correction coefficient α |
|---|---|
| $+0.9 \leq EV$ | 0 |
| $+0.6 \leq EV < +0.9$ | 0.3 |
| $+0.3 \leq EV < +0.6$ | 0.6 |
| $-0.3 < EV < +0.3$ | 1 |
| $-0.9 < EV \leq -0.3$ | 1.3 |
| $EV \leq -0.9$ | 1.6 |

|  | Brightness value correction amount | |
| --- | --- | --- |
|  | Conventional technique | Technique of present embodiment |
| Normal image quality adjustment | 16 | 16 |
| In consideration of exposure correction EV=−1.0 | 14 | 8 |
| In consideration of exposure correction EV=−2.0 | 11 | 4 |

Fig.8

| Exposure correction amount | Contrast correction coefficient $\alpha$ |
| --- | --- |
| +0.9≦EV | 0 |
| +0.6≦EV<+0.9 | 0.3 |
| +0.3≦EV<+0.6 | 0.6 |
| −0.3<EV<+0.3 | 1 |
| −0.9<EV≦−0.3 | 1.3 |
| EV≦−0.9 | 1.6 |

Fig.9

ADJUSTMENT FOR OUTPUT IMAGE OF IMAGE DATA

FIELD OF TECHNOLOGY

The present invention relates to image adjustment technology for adjusting the brightness value of image data.

BACKGROUND OF THE INVENTION

The image quality of image data generated by a digital still camera (DSC), a digital video camera (DVC), a scanner, or the like can be adjusted arbitrarily by using an image retouch application on a personal computer. The image retouch application generally has an image adjustment function for automatically adjusting the image quality (or characteristics) of image data, and the use of this image adjustment function can easily adjust the image quality of image data, which is to be output from an output device, to a standard image quality. Devices such as a CRT, a LCD, a printer, a projector, and a television are generally known as output devices of image data.

A printer driver that controls operations of a printer, which is one of the output devices, also has an image adjustment function for automatically adjusting the image quality (or characteristics) of image data. Accordingly, it is also possible to use such a printer driver to adjust the image quality of image data, which is to be printed out, to a standard image quality.

In the automatic image quality adjustment function provided by an image retouch application or the like, an image quality correction is typically executed on the basis of a standard image quality of image data. However, since the image data targeted for image processing may be generated under various conditions, the image quality (or characteristics) of the image data may not be sufficiently corrected with the automatic image quality adjustment function, which corrects the image quality equally with a reference value under the assumption that the image data is standard.

Some image data generating devices such as a DSC can arbitrarily adjust the image quality of image data at the time of its generation, so that its user can generate the image data purposefully with a given image quality. When the automatic image quality adjustment function is executed on such image data, even an image characteristic that was purposefully provided to the image data may be equally adjusted with a reference value, which makes it impossible to obtain an output image that reflects the intention of the user.

SUMMARY OF THE INVENTION

The present invention solves the problems described above by automatically adjusting the image quality of image data without damaging the output tendency of image processing that was intentionally performed on the image data.

A first aspect of the present invention provides an image processing method for image data that uses image data and an exposure correction amount for the image data. The image processing method of the first aspect of the present invention includes determining a brightness value correction amount of the image data by using a brightness value reference value that is to become a criterion for an image adjustment regarding brightness value; determining a contrast correction amount of the image data by using a contrast reference value that is to become a criterion for an image adjustment regarding contrast; modifying the brightness value correction amount to be smaller as the exposure correction amount is increased; in the case where the exposure correction amount is a positive correction amount, modifying the contrast correction amount to be smaller as the exposure correction amount is increased; and adjusting the brightness value and the contrast of the image data by applying the modified brightness value correction amount and contrast correction amount.

According to the image processing method of the first aspect of the present invention, the contrast correction amount of the image data is determined with the use of the contrast reference value, which is to become a criterion for the image adjustment regarding the contrast, and in a case where the exposure correction amount is a positive correction amount, the determined contrast correction amount is reduced as the exposure correction value is increased, and the contrast of the image data is adjusted with the use of the modified contrast correction amount. In general, the exposure correction amount is often set to be a positive correction amount for a close-up view image such as a portrait image. Accordingly, even in an image quality adjustment (an automatic image quality adjustment) based on a reference value, it is still possible to perform a contrast correction for image data as intended by the user, by reducing or weakening the contrast correction amount as the exposure correction amount is increased. Similarly, it is also possible to execute the image quality adjustment (the automatic image quality adjustment) with a reference value for the brightness value, without damaging output conditions that were intentionally set with respect to the brightness value. Accordingly, even if the image quality is automatically adjusted, it is still possible to obtain a weakened output result as intended in the case where a weakened output result is intended, and at the same time, it is also possible to obtain a brightened output result as intended in the case where a bright output result is intended and a dark output result as intended in case where a dark output result is intended, respectively.

In the image processing method of the first aspect of the present invention, in the case where the exposure correction amount is a negative correction amount, the contrast correction amount may be modified to be larger as the absolute value of the exposure correction amount is increased, and the brightness value correction amount may be modified to be smaller in geometric progression. In general, the exposure correction amount is often set to be a negative correction amount for a distant view image such as a scenery shot. Accordingly, even if the image quality is automatically adjusted, it is still possible to perform a contrast correction for image data as intended by the user, by increasing or hardening the contrast correction amount as the exposure correction amount is increased.

In the image processing method of the first aspect of the present invention, the modification of the brightness value correction amount may be executed by differentiating the degree of variation of the brightness value correction amount at the time when the exposure correction amount is less than a given exposure correction amount, from the degree of variation of the brightness value correction amount at the time when the exposure correction amount is equal to or more than the given exposure correction amount. Alternatively, the modification of the brightness value correction amount may also be executed by decreasing the rate of reduction of the brightness value correction amount as the exposure correction amount is increased. With such a structure, it is possible to maintain gradations in highlight areas or shadow areas irrespective of the increase in exposure correction amount, so that white skipping or black crushing can be prevented.

In the image processing method of the first aspect of the present invention, the modification of the brightness value correction amount may also be executed by decreasing the brightness value correction amount in geometric progression as the exposure correction amount is increased. In such a case, even if the image quality is automatically adjusted, it is still possible to obtain more properly a bright output result in the case where a bright output result is intended and more properly a dark output result in case where a dark output result is intended, respectively. The modification of the brightness value correction amount may also be executed by dividing the brightness value correction amount by an exponential function that has the exposure correction amount as its parameter. In such a case, it is possible to decrease the brightness value correction amount in geometric progression as the exposure correction amount is increased.

In the image processing method of the first aspect of the present invention, the modification of the contrast correction amount may also be executed by multiplying the square root of the contrast correction amount by a coefficient that has the exposure correction amount as its parameter. In such a case, the contrast correction amount can be modified according to the exposure correction amount.

The image processing method of the first aspect of the present invention may further analyze the image data to obtain a contrast characteristic value that indicates a characteristic regarding the contrast of the image data, and the determination of the contrast correction amount may be executed in a way to reduce the deviation between the contrast reference value and the obtained contrast characteristic value. In such a case, it is possible to correct the characteristics regarding the brightness value and the contrast of the image data in a more proper way, based on the characteristics of the respective image data.

The image processing method of the first aspect of the present invention may further analyze the image data to obtain a brightness value characteristic value that indicates a characteristic regarding the brightness value of the image data, analyze the image data to obtain a contrast characteristic value that indicates a characteristic regarding the contrast of the image data, determine the brightness value correction amount in a way to reduce the deviation between the bright value reference value and the obtained brightness value characteristic value, divide the determined brightness value correction amount by an exponential function that has the exposure correction amount as its parameter, determine the contract correction amount in a way to reduce the deviation between the contrast reference value and the obtained contrast characteristic value, and multiply the square root of the determined contrast correction amount by a coefficient that has the exposure correction amount as its parameter. In such a case, it is possible to correct the characteristics regarding the brightness value and the contrast of the image data in a more proper way, based on the characteristics of the respective image data.

The image processing method of the first aspect of the present invention may further receive contrast correction information that specifies the tendency of the contrast correction of the image data, determine the contrast correction amount of the image data based on the received contrast correction information, and multiply the square root of the determined contrast correction amount by a coefficient that has the exposure correction amount as its parameter. In such a case, it is possible to correct the characteristic regarding the contrast of the image data in a more proper way, based on the received tendency of the contrast correction.

The image processing method of the first aspect of the present invention may further output an image based on the brightness value-adjusted and contrast-adjusted image data. In such a case, it is possible to output an image that has the corrected characteristics regarding the brightness value and the contrast.

The first aspect of the present invention may also be implemented as an image processing device that executes image processing for image data by using image data and an exposure correction amount for the image data. The image processing device of the first aspect of the present invention includes: a correction amount determination unit that determines a brightness value correction amount and a contrast correction amount of the image data by using a brightness value reference value and a contrast reference value that are to become a criterion for an image adjustment regarding brightness value; a brightness value correction amount modification unit that decreases the brightness value correction amount as the exposure correction amount is increased; a contrast correction amount modification unit that decreases the contrast correction amount as the exposure correction amount is increased, in the case where the exposure correction amount is a positive correction amount; and an image quality adjustment unit that adjusts the brightness value of the image data by applying the modified brightness value correction amount and adjusts the contrast of the image data by applying the modified contrast correction amount.

According to the image processing device of the first aspect of the present invention, it is possible to attain the same functions and effects as the image processing method of the first aspect of the present invention. The image processing device of the first aspect of the present invention may also be implemented in the same various aspects as those of the image processing method of the first aspect of the present invention.

The first aspect of the present invention may also be implemented as a recording medium that is stored with program instructions, which cause image processing for image data to be executed in a computer with the use of image data and an exposure correction amount for the image data. The recording medium of the first aspect of the present invention includes: a computer instruction that determines a brightness value correction amount of the image data by using a brightness value reference value that is to become a criterion for an image adjustment regarding brightness value; a computer instruction that determines a contrast correction amount of the image data by using a contrast reference value that is to become a criterion for an image adjustment regarding contrast; a computer instruction that modifies the brightness value correction amount smaller as the exposure correction amount is increased; a computer instruction that modifies the contrast correction amount smaller as the exposure correction amount is increased, in the case where the exposure correction amount is a positive correction amount; and a computer instruction that adjusts the brightness value and the contrast of the image data by applying the modified brightness value correction amount and contrast correction amount.

According to the recording medium of the first aspect of the present invention, it is possible to attain the same functions and effects as the image processing method of the first aspect of the present invention. The recording medium of the first aspect of the present invention may also be implemented in the same various aspects as those of the image processing method of the first aspect of the present invention.

A second aspect of the present invention provides an image output method that outputs an image based on image data, which has undergone image processing using an exposure correction amount. The image output method of the second aspect of the present invention includes: determining a brightness value correction amount and a contrast correction amount of the image data by using a brightness value reference value and a contrast reference value that are to become a criterion for an image adjustment regarding brightness value; modifying the brightness value correction amount smaller as the exposure correction amount is increased; modifying the contrast correction amount so that the contrast correction amount is reduced as the exposure correction amount is increased, in the case where the exposure correction amount is a positive correction amount; adjusting the brightness value of the image data by applying the modified brightness value correction amount and adjusting the contrast of the image data by applying the modified contrast correction amount; and outputting an image based on the brightness value-adjusted and contrast adjusted image data.

According to the image output method of the second aspect of the present invention, it is possible to output an image that has the characteristics regarding the brightness value and the contrast having been corrected.

In the image output method of the second aspect of the present invention, the modification of the contrast correction amount may also be executed by increasing the contrast correction amount as the absolute value of the exposure correction amount is increased, in the case where the exposure correction amount is a negative correction amount. In general, the exposure correction amount is often set to be a negative amount for a distant view image such as a scenery shot. Accordingly, even if the image quality is automatically adjusted, it is still possible to output an image that has its contrast having been corrected as intended by the user, by increasing or hardening the contrast correction amount as the exposure correction amount is increased.

The second aspect of the present invention may also be implemented as an image output device that outputs an image by using image data that has undergone image processing using an exposure correction amount. The image output device of the second aspect of the present invention includes: a correction amount determination unit that determines a brightness value correction amount and a contrast correction amount of the image data by using a brightness value reference value and a contrast reference value that are to become a criterion for an image adjustment regarding brightness value; a brightness value correction amount modification unit that reduces the brightness value correction amount as the exposure correction amount is increased; a contrast correction amount modification unit that decreases the contrast correction amount as the exposure correction amount is increased, in the case where the exposure correction amount is a positive correction amount; an image quality adjustment unit that adjusts the brightness value of the image data by applying the modified brightness value correction amount and adjusts the contrast of the image data by applying the modified contrast correction amount; and an output unit that outputs an image based on the brightness value-adjusted and contrast-adjusted image data.

According to the image output device of the second aspect of the present invention, it is possible to attain the same functions and effects as the image output method of the second aspect of the present invention. The image output device of the second aspect of the present invention may also be implemented in the same various aspects as those of the image output method of the second aspect of the present invention.

The second aspect of the present invention may also be implemented as a recording medium that is stored with program instructions to be executed in a computer, where the program instructions are for outputting an image based on image data that has undergone image processing using an exposure correction amount. The recording medium of the second aspect of the present invention includes: a computer instruction that determines a brightness value correction amount and a contrast correction amount of the image data by using a brightness value reference value and a contrast reference value which are to become a criterion for an image adjustment regarding brightness value; a computer instruction that modifies the brightness value correction amount to be smaller as the exposure correction amount is increased; a computer instruction that modifies the contrast correction amount so that the contrast correction amount is reduced as the exposure correction amount is increased, in the case where the exposure correction amount is a positive correction amount; a computer instruction that adjusts the brightness value of the image data by applying the modified bright value correction amount and adjusts the contrast of the image data by applying the modified contrast correction amount; and a computer instruction that outputs an image based on the brightness value-adjusted and contrast-adjusted image data.

According to the recording medium of the second aspect of the present invention, it is possible to attain the same functions and effects as the image output method of the second aspect of the present invention. The recording medium of the second aspect of the present invention may also be implemented in the same various aspects as those of the image output method of the second aspect of the present invention.

A third aspect of the present invention provides an image processing method that executes image processing for image data by using image data and information of an exposure correction that was executed for the image data. The image processing method of the third aspect of the present invention includes: analyzing the image data to obtain a brightness value characteristic value that indicates a characteristic regarding the brightness value of the image data; analyzing the image data to obtain a contrast characteristic value that indicates a characteristic regarding contrast of the image data; reducing the deviation between a brightness value reference value, which is to become a criterion for an image quality adjustment regarding the brightness value, and the obtained brightness value characteristic value; reducing the deviation between a contrast reference value, which is to become a criterion for an image quality adjustment regarding the contrast, and the obtained contrast characteristic value; adjusting the degree of reduction of the deviation regarding the brightness value to be smaller as the level of an exposure correction that was executed on the image data is increased, based on the information of the exposure correction; and adjusting the degree of reduction of the deviation regarding the contrast to be smaller as the level of a positively-headed exposure correction that was executed on the image data is increased, based on the information of the exposure correction.

According to the image processing method of the third aspect of the present invention, in the process of reducing the deviation between a contrast reference value, which is to become a criterion for an image quality adjustment regarding the contrast, and the obtained contrast characteristic value, the degree of reduction of the deviation is decreased as the level of a positively-headed exposure correction that was executed on the image data is increased, based on the information of the exposure correction. It is thus possible to execute the contrast correction in a way as intended by the user and based on the information of the exposure correction. In other words, when the level of the positively-headed exposure correction is large, the image is often a close-up view image such as a portrait shot. In such a case, it is possible to perform a contrast correction on the image data in a way as intended by the user and in responsive to the exposure correction amount, by decreasing or weakening the contrast correction amount as the level of the exposure correction is increased. Additionally, in the process of reducing the deviation between a brightness value reference value, which is to become a criterion for an image quality adjustment regarding the brightness value, and the obtained brightness value characteristic value, the degree of reduction of the deviation is decreased as the level of an exposure correction that was executed on the image data is increased, based on the information of the exposure correction. It is thus possible to automatically adjust the image quality of the image data without damaging output conditions that were intentionally set with respect to the brightness value. Accordingly, even if the image quality is automatically adjusted, it is still possible to obtain a weakened output result as intended in the case where a weakened output result is intended, and at the same time, it is also possible to obtain a bright output result in case where a bright output result is intended and a dark output result in the case where a dark output result is intended, respectively.

In the image processing method of the third aspect of the present invention, the adjustment of the contrast deviation reduction amount may also be executed by increasing the degree of reduction of the deviation regarding the contrast as the absolute level of a negatively-headed exposure correction that was executed on the image data is increased, based on the information of the exposure correction. In such a case, it is possible to execute a contrast correction as intended by the user based on the information of the exposure correction. In other words, when the absolute level of the negatively-headed exposure correction is large, the image is often a distant view image such as a scenery shot. In such a case, even if the image quality is automatically adjusted, it is possible to perform a contrast correction on the image data in a way as intended by the user, by increasing or hardening the contrast correction amount as the absolute level of the exposure correction is increased.

The third aspect of the present invention provides an image processing device that executes image processing for image data by using image data and information of an exposure correction that was executed on the image data. The image processing device of the third aspect of the present invention includes: a brightness value characteristic value obtaining unit that analyzes the image data to obtain a brightness value characteristic value, which indicates a characteristic regarding brightness value of the image data; a contrast characteristic value obtaining unit that analyzes the image data to obtain a contrast characteristic value, which indicates a characteristic regarding contrast of the image data; a brightness value adjustment unit that reduces the deviation between a brightness value reference value, which is to become a criterion for an image quality adjustment regarding the brightness value, and the obtained brightness value characteristic value; a contrast adjustment unit that reduces the deviation between a contrast reference value, which is to become a criterion for an image quality adjustment regarding the contrast, and the obtained contrast characteristic value; a brightness value deviation reduction amount adjustment unit that decreases the degree of reduction of the deviation regarding the brightness value as the level of an exposure correction that was executed on the image data is increased, based on the information of the exposure correction; and a contrast deviation reduction amount adjustment unit that decreases the degree of reduction of the deviation regarding the contrast as the level of a positively-headed exposure correction that was executed on the image data is increased, based on the information of the exposure correction.

According to the image processing device of the third aspect of the present invention, it is possible to attain the same functions and effects as the image processing method of the third aspect of the present invention. The image processing device of the third aspect of the present invention may also be implemented in the same various aspects as those of the image processing method of the third aspect of the present invention.

The third aspect of the present invention may also be implemented as a recording medium that is stored with image processing program instructions, which cause image processing for image data to be executed in a computer with the use of image data and an exposure correction amount for the image data. The recording medium of the third aspect of the present invention includes: a program instruction that determines a brightness value correction amount of the image data by using a brightness value reference value that is to become a criterion for an image adjustment regarding brightness value; a program instruction that determines a contrast correction amount of the image data by using a contrast reference value that is to become a criterion for an image adjustment regarding contrast; a program instruction that modifies the brightness value correction amount smaller as the exposure correction amount is increased; a program instruction that modifies the contrast correction amount to be smaller as the exposure correction amount is increased, in the case where the exposure correction amount is a positive correction amount; and a program instruction that adjusts the brightness value and the contrast of the image data by applying the modified brightness value correction amount and contrast correction amount.

According to the recording medium of the third aspect of the present invention, it is possible to attain the same functions and effects as the image processing method of the third aspect of the present invention. The recording medium of the third aspect of the present invention may also be implemented in the same various aspects as those of the image processing method of the third aspect of the present invention.

BRIEF DESCRIPTION OF THE DRAWINGS

FIG. 8 is a schematic that shows brightness value correction amounts according to a conventional technique versus bright value correction amounts according to a technique of the present embodiment.

FIG. 9 is a schematic that shows an example of a map that coordinates exposure correction amounts EV and contrast correction coefficients.

DETAILED DESCRIPTION OF THE PREFERRED EMBODIMENTS

The following describes an image processing device of the present invention with reference to the drawings and based on exemplary embodiments.

A. Structure of Image Processing System

Figure 1:
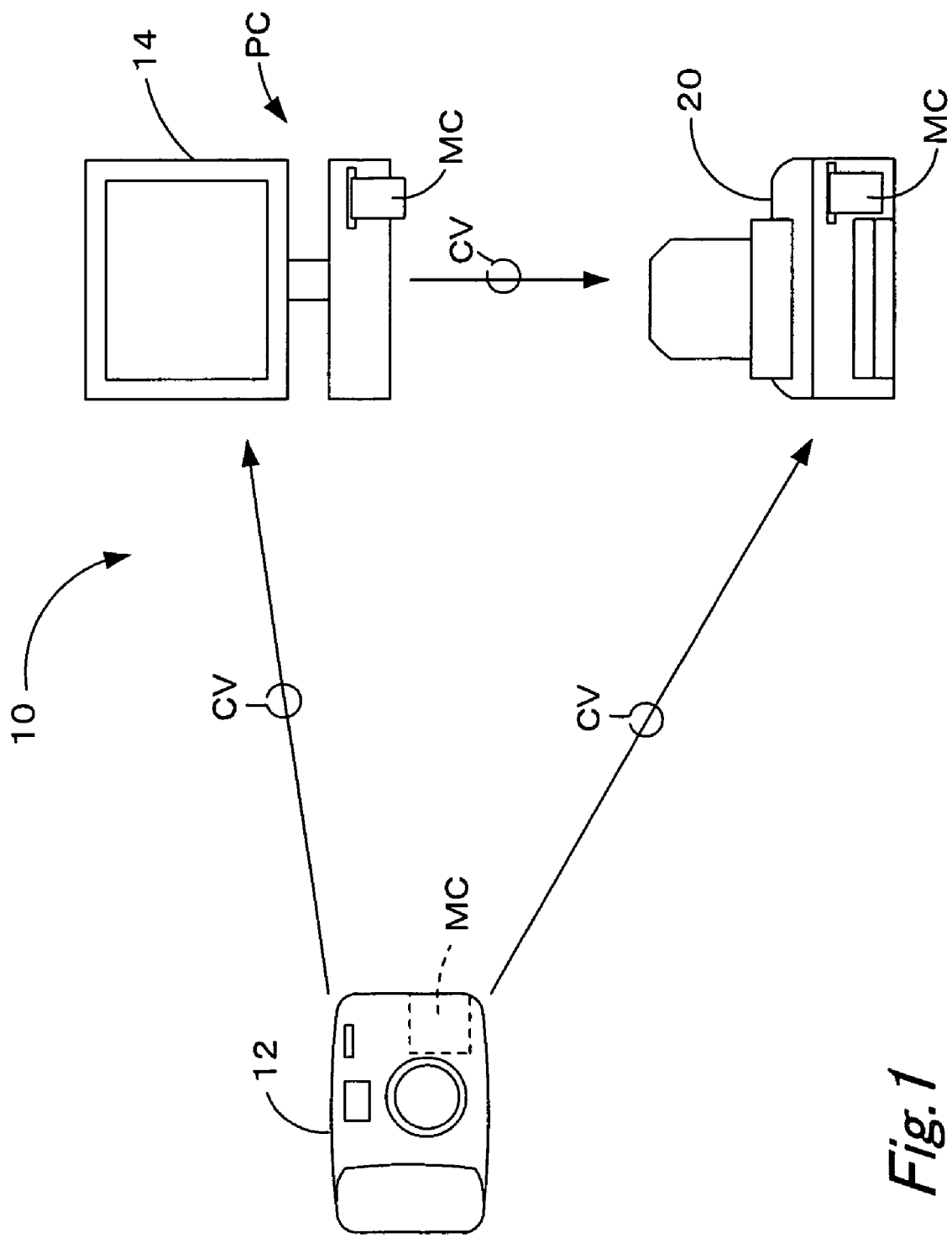
FIG. 1 is a schematic that shows an example of an image processing system, which is applicable with an image processing device of the present embodiment.
Figure 2:
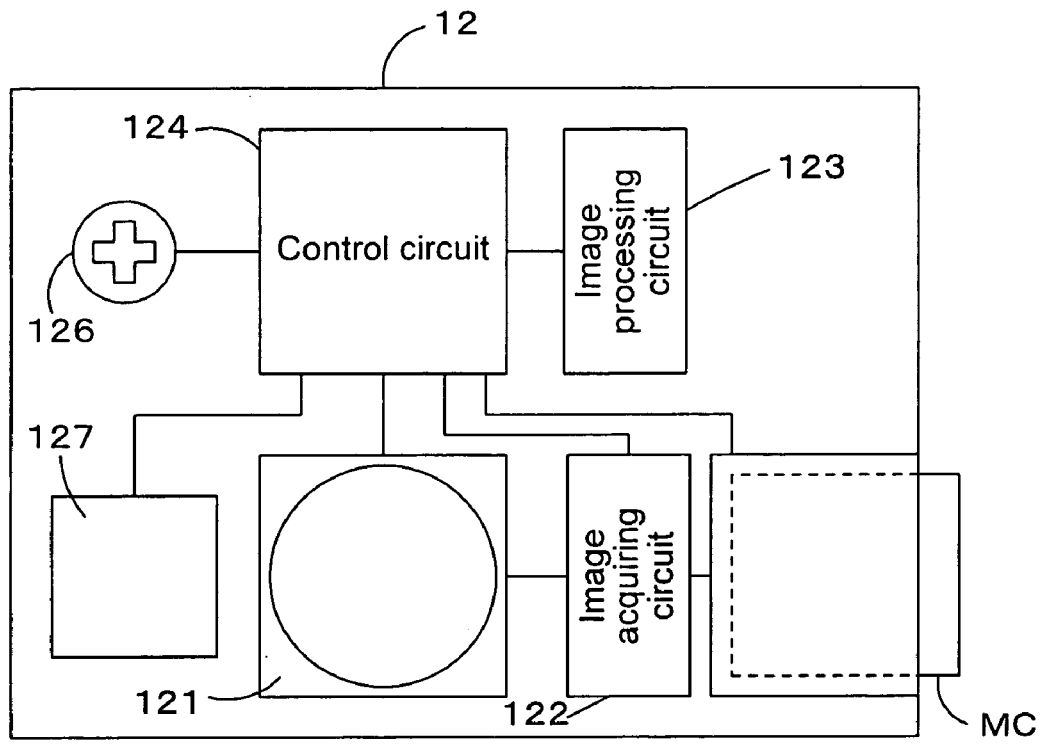
FIG. 2 is a block diagram that shows the general configuration of a digital still camera that is capable of generating image data, which is to become the subject of processing in an image processing device of the present embodiment.
Figure 3:
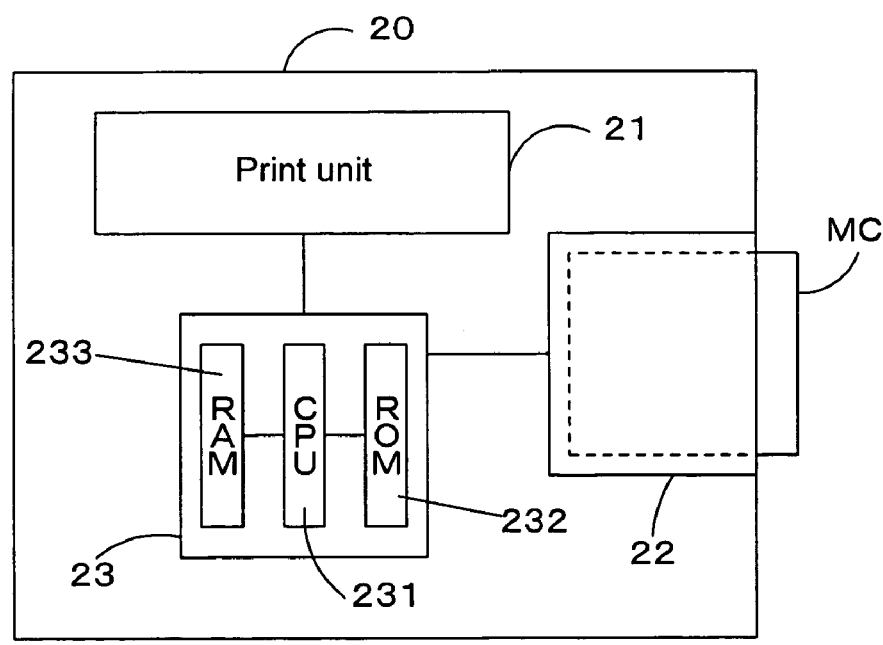
FIG. 3 is a block diagram that shows the general configuration of a color printer that functions as an image processing device of the present embodiment.

The configuration of an image processing system that is applicable with an image processing device of the present embodiment will now be described with reference to FIG. 1 through FIG. 3. FIG. 1 is a schematic that shows an example of an image processing system, which is applicable with an image processing device of the present embodiment. FIG. 2 is a block diagram that shows the general configuration of a digital still camera that is capable of generating image data, which is to become the subject of processing in an image processing device of the present embodiment. FIG. 3 is a block diagram that shows the general configuration of a color printer that functions as an image processing device of the present embodiment.

As shown in FIG. 1, an image processing system 10 includes: a digital still camera 12 as an input device that generates image data; a personal computer PC as an image processing device that executes image processing on image data, which was generated in the digital still camera 12; and a color printer 20 as an output device that outputs images. Although the output device is not limited to the printer 20 and other devices such as a monitor 14, e.g., a CRT display or a LCD display, and a projector may also be used as the output device, the color printer 20 is used as the output device in the following description.

With reference to FIG. 2, the digital still camera 12 is a camera that electrically obtains an image by focusing optical information onto a digital device (a CCD or a photoelectron multiplier), and the camera 12 includes: an optical circuit 121 that includes a CCD or the like for the collection of optical information; an image obtaining circuit 122 for controlling the optical circuit 121 to obtain an image; an image processing circuit 123 for processing the obtained digital image; and a control circuit 124 that includes a memory for the temporal storage of data and controls each circuit. The digital still camera 12 handles the obtained image as digital data and stores it into a storage device such as a memory card MC. Although JPEG format is generally used to store image data in the digital still camera 12, other storage formats may also be used such as RAW format, TIFF format, GIF format, and BMP format.

The digital still camera 12 includes: a select and decide button 126 for setting a photo mode, an exposure correction amount (an exposure correction value), a light source, etc.; and a liquid crystal display 127 for previewing a shot image or for setting an exposure correction amount or the like by means of the select and decide button 126. Since a proper exposure is automatically set in the digital still camera 12, the exposure correction amount that is set in the digital still camera 12 is set as a plus correction amount or a minus correction amount with respect to the proper exposure. The exposure correction amount is represented as an exposure amount EV: in the case where no correction is made to the exposure, the exposure correction amount is set as EV=±0; in the case where the exposure needs to be corrected brighter than the proper exposure, the exposure correction amount is set in the plus direction such as +0.1 EV or +2.0 EV; and in the case where the exposure needs to be corrected darker than the proper exposure, the exposure correction amount is set in the minus direction such as −0.1 EV or −2.0 EV, for example.

The digital still camera 12 that is used in the image data output system 10 stores image data GD and additionally the photo information PI of the image data into the memory card MC, as an image file GF. In other words, at the time of shooting, the photo information PI is automatically stored in the memory card MC together with the image data GD to form an image file GF. For example, in the case where a photo parameter such as an exposure correction amount or a light source is set to a given value by a user, the memory card is stored with an image file GF, which includes image data GF that is generated according to the set value of the exposure correction amount and photo information PI that has the set value of the parameter being described therein.

The image file GF that was generated in the digital still camera 12 is transmitted to the color printer 20 via a cable CV or a computer PC. Alternatively, the image file is transmitted to the color printer 20 by connecting the memory card MC, which is stored with the image file GF in the digital still camera 12, to the printer 20 via a computer PC that is attached to a memory card slot or by connecting the memory card MC directly to the printer 20. The present embodiment is described with respect to a case where the color printer 20 executes image processing and output (print) processing in a stand-alone mode.

The color printer 20 shown in FIG. 3 is a printer that is capable of outputting color images, and is, for example, an inkjet printer that forms images by injecting four colors of inks: Cyan (C); Magenta (M); Yellow (Y); and Black (K) onto printing media to form dot patterns. Alternatively, the printer is an electro-photographic printer that forms images by transferring and fixing color toner onto printing media. In addition to the aforementioned four colors, Light Cyan (light cyan, LC), Light Magenta (light magenta, LM), and Dark Yellow (dark yellow, DY) may also be used as color inks.

The color printer 20 includes: a print unit 21 that includes a print head or a rotating drum and executes print processing on a printing medium; a slot 22 that receives a memory card MC; and a control circuit 23 that controls operations of each unit in the color printer 20. The control circuit 23 includes: a processor (CPU) 231 that executes various processing; a read-only memory (ROM) 232 that stores programs or the like to be executed in the CPU 231; and a random access memory (RAM) 233 that temporarily stores processing results and obtained data from the CPU 231. The control circuit 23 analyzes photo information PI that was read from the memory card MC and controls the movements of a paper feed motor, a carriage motor, a print head, or the like (not shown), based on the analyzed photo information PI.

B. Structure of Image File

An image file GF of the present embodiment can have a file structure that conforms to the image file format standard (Exif) for digital still cameras, for example. Specifications for Exif files are laid down by the Japan Electronics and Information Technology Industries Association (JEITA), and there exists a JPEG-Exif file that stores compressed JPEG data as image data and a TIFF-Exif file that stores uncompressed TIFF data as image data. A compressed file or a JPEG-Exif file is used in the following description.

Figure 4:
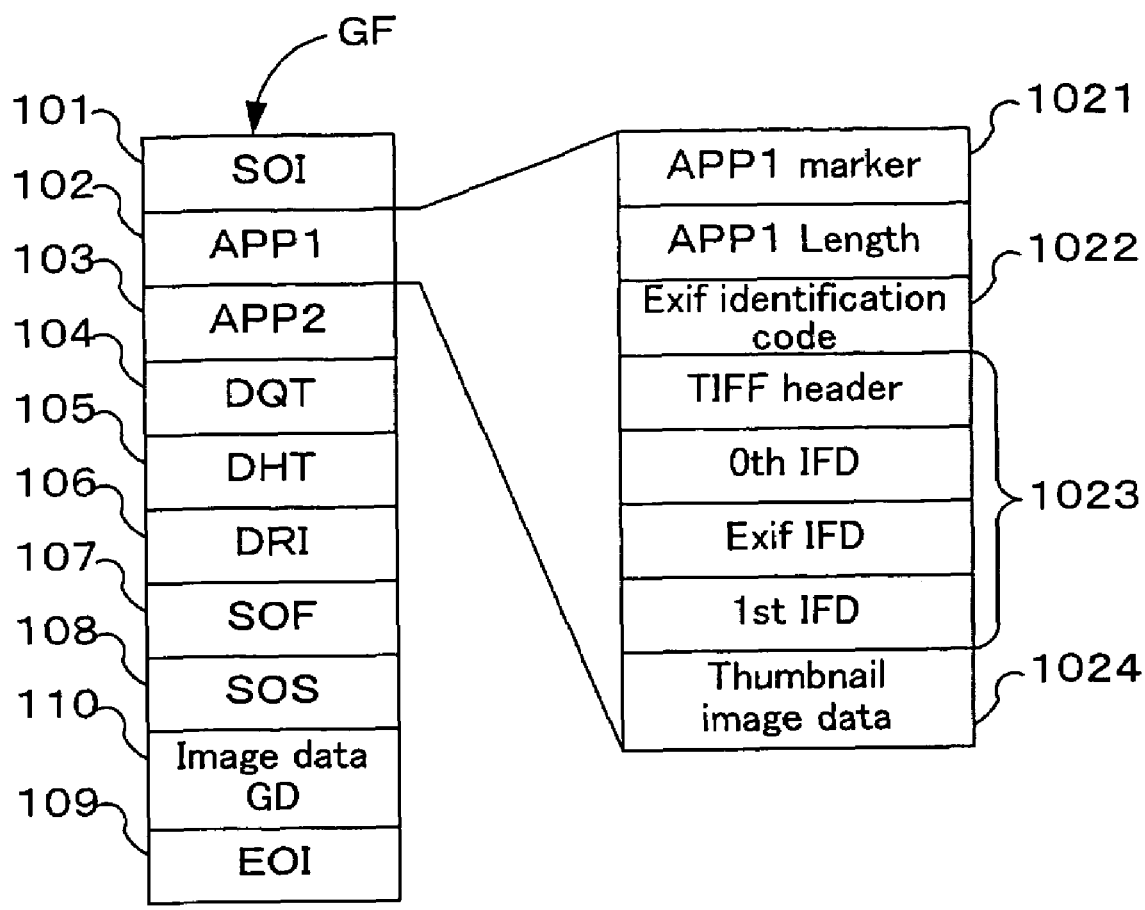
FIG. 4 is a schematic that shows the general inner structure of an image file GF that conforms to the Exif format.

The general configuration of an image file that conforms to the Exif format and may be used in the present embodiment will now be described with reference to FIG. 4. FIG. 4 is a schematic that shows the general inner structure of an image file GF that conforms to the Exif format. It should be noted that each of the terms such as file structure, data structure, and storage region used herein in the present embodiment represents an image of a file or data when the file, the data, or the like is in a state of being stored in a storage device.

An image file GF includes: a SOI marker segment 101 that indicates the head of the compressed data; an APP1 marker segment 102 that stores Exif adjunct information; an APP2 marker segment 103 that stores Exif extended data; a DQT marker segment 104 that defines a quantization table; a DHT marker segment 105 that defines a Huffman table; a DRI marker segment 106 that defines insertion spacing of restart markers; a SOF marker segment 107 that indicates various parameters regarding frames; a SOS marker segment 108 that indicates various parameters regarding scans; and an EOI marker segment 109 that indicates the end of the compressed data. The compressed image data GD is stored in an image data storage region 110 between the SOS marker segment 108 and the EOI marker segment 109. It should be noted that each marker segment may be recoded in any order as long as the APP1 marker segment and the APP2 marker segment are recorded immediately following the SOI marker segment and the SOS marker segment is recorded immediately prior to the EOI marker segment with the image data being sandwiched therebetween.

The APP1 marker segment 102 includes: an APP1 marker 1021; an Exif identification code 1022; adjunct information 1023; and a thumbnail image 1024. The adjunct information has a TIFF structure including a file header (a TIFF header), and in the case where Exif-JPEG is used, the structure includes: a 0th IFD that stores adjunct information regarding the compressed image data; an Exif IFD that stores Exif-specific adjunct information including photo information PI; and a 1st IFD that stores adjunct information regarding the thumbnail image. The Exif IFD is pointed by an offset that is from the TIFF header and is stored in the 0th IFD. In the IFDs, tags are used to specify each piece of information, which is sometimes referred to by its tag name.

The photo information PI is a piece of information associated with image quality at the time of the generation (or the shot) of image data in an image data generation device such as a digital still camera 12 (an image quality generation information), and may include: an exposure time that is automatically recorded in association with the shot of an image; an ISO sensitivity; a diaphragm; a shutter speed; a parameter regarding a focal distance; and parameters regarding an exposure correction amount, a light source, a photo mode, and such, which are arbitrarily set by a user.

Figure 5:
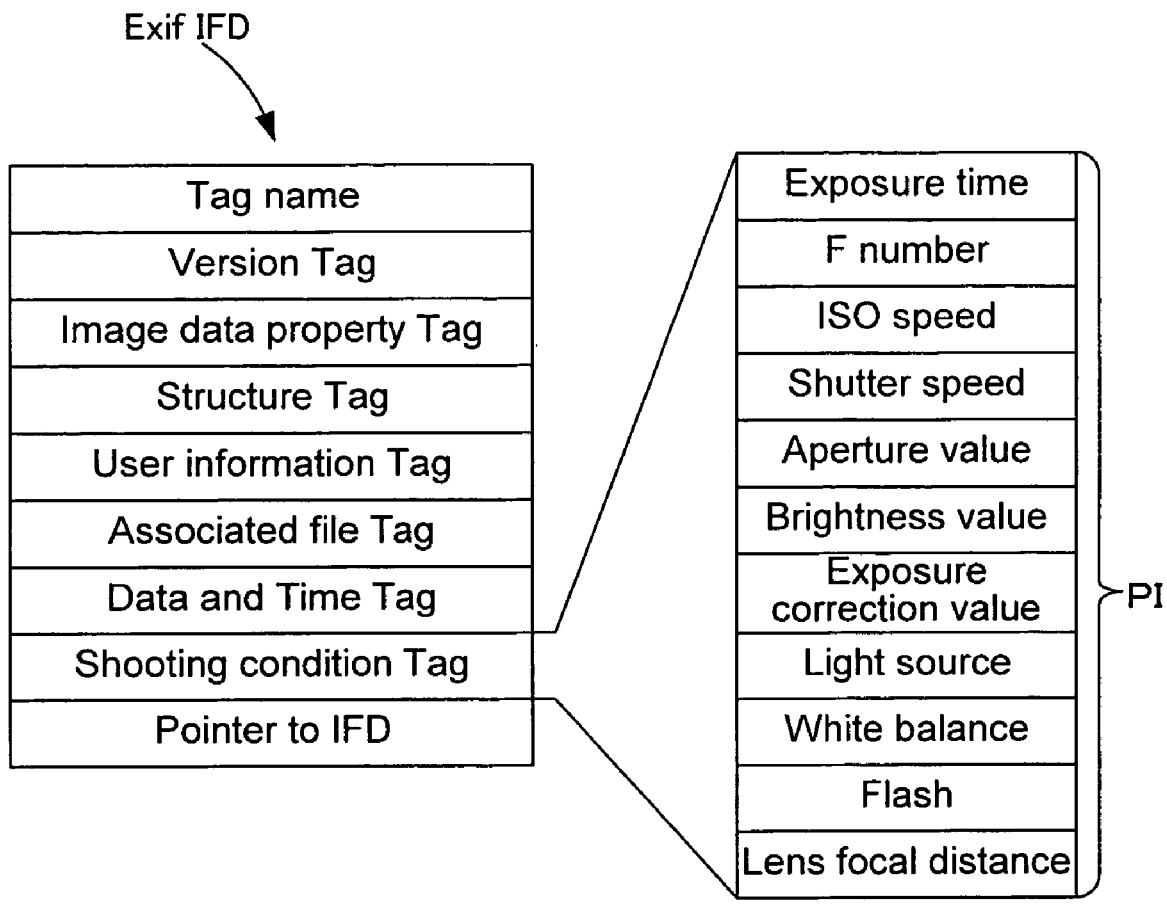
FIG. 5 is a schematic that shows an example of detailed adjunct information stored in Exif IFD of an image file GF, which may be used in the present embodiment.

Detailed adjunct information that is stored in the Exif IFD will now be described in detail with respect to FIG. 5. FIG. 5 is a schematic that shows an example of detailed adjunct information that is stored in an Exif IFD of an image file GF, which may be used in the present embodiment.

The Exif IFD is stored with tags such as Exif version information, color space information, date and time of image data generation, and shooting conditions, respectively. The tags regarding shooting conditions (photo information (IP)) are stored with parameter values such as an exposure time, a lens F value, an exposure control mode, an ISO sensitivity, an exposure correction amount, a light source, a white balance, a flash, a focal distance, and so forth, respectively, according to a predefined offset. A desired piece of photo information PI can be obtained on the image processing device (output device) side, by specifying an offset that corresponds to a desired piece of tag information (a parameter).

C. Image Processing in Color Printer 20

Figure 6:
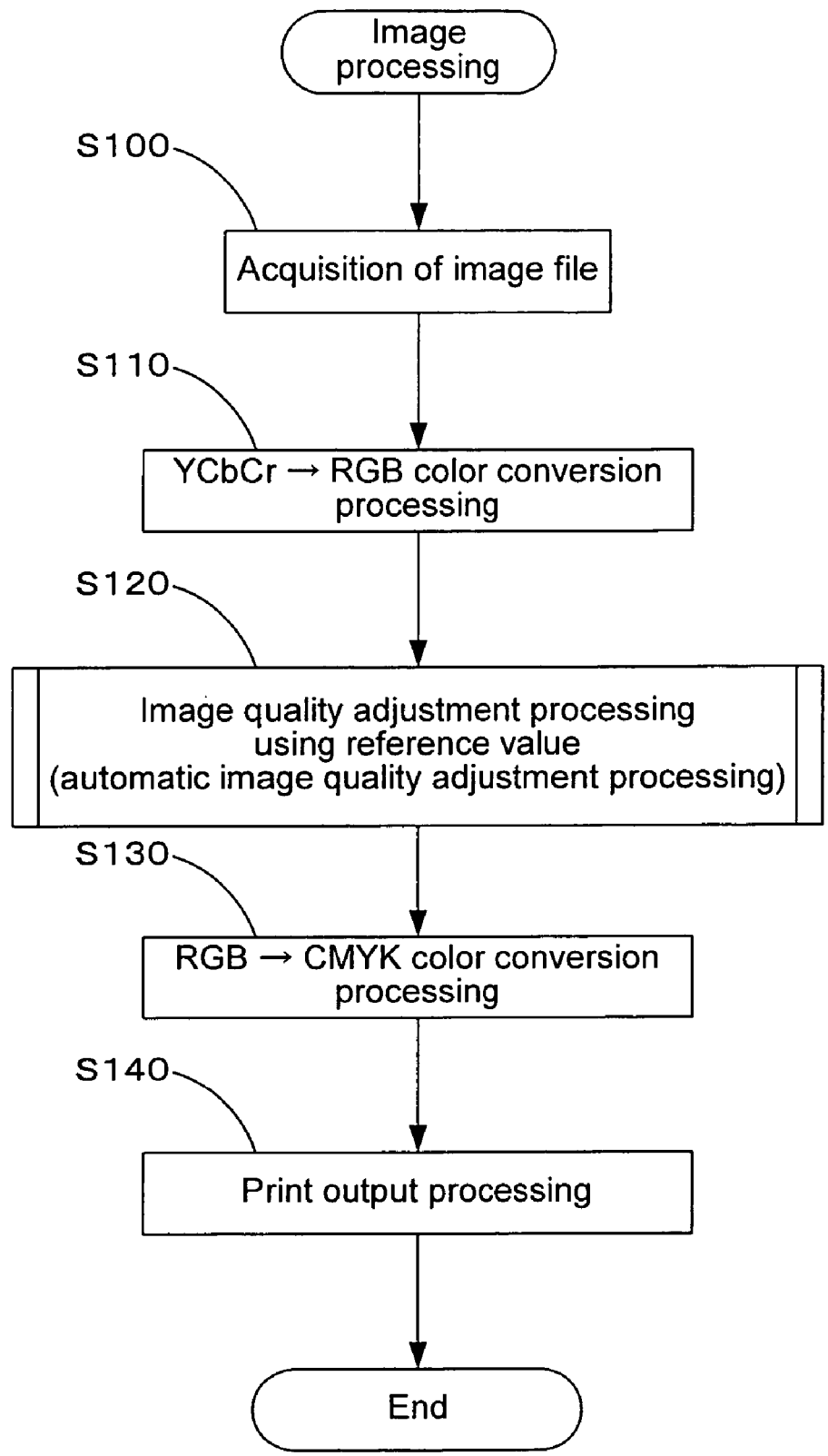
FIG. 6 is a flowchart that shows the processing routine of image processing in a color printer 20 of the present embodiment.
Figure 7:
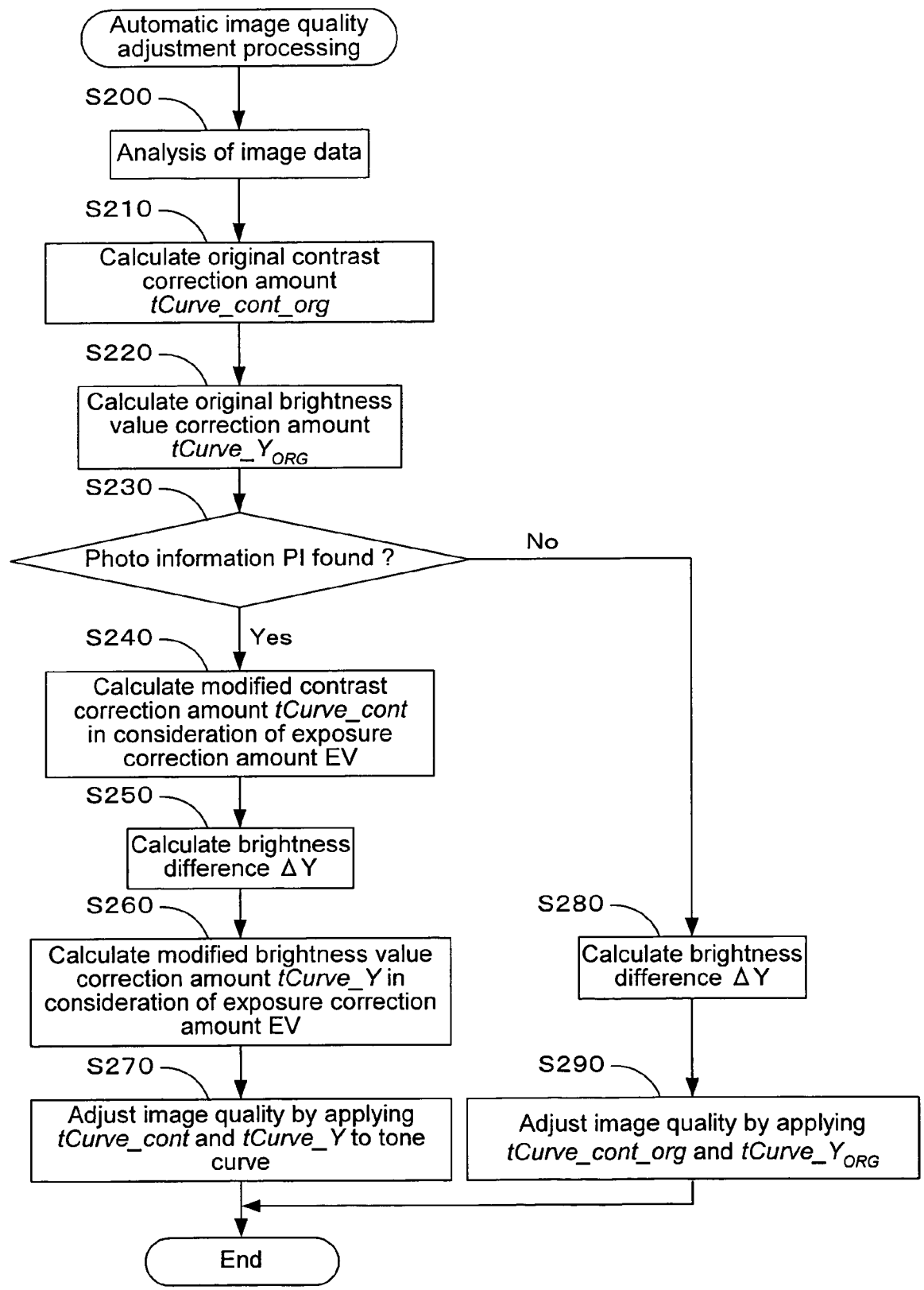
FIG. 7 is a flowchart that shows the processing routine of an automatic image quality adjustment process that uses a reference value and is performed in an image processing device (a color printer 20) of the present embodiment.

Image processing that is executed in a color printer 20 will now be described with reference to FIG. 6 through FIG. 9. FIG. 6 is a flowchart that shows the processing routine of image processing in an image processing device (a color printer 20) of the present embodiment. FIG. 7 is a flowchart that shows the processing routine of an image quality adjustment process (automatic image quality adjustment processing) that uses a reference value and is performed in an image processing device (a color printer 20) of the present embodiment. FIG. 8 is a schematic that shows brightness value correction amounts according to a conventional technique versus brightness value correction amounts according to a technique of the present embodiment. FIG. 9 is a schematic that shows an example of a map that coordinates exposure correction amounts EV and contrast correction coefficients.

When a memory card MC is inserted into the slot 22, the control circuit 23 (the CPU 231) of the color printer 20 retrieves an image file GF from the memory card MC and temporarily stores the retrieved image file GF into the RAM 233 (step S100). The CPU 231 then extends image data that is included in the retrieved image file GF, and executes a matrix operation on the extended image data GD with the use of a matrix S to execute a YCbCr ? RGB color conversion processing (step S110).

As described previously, the image file GF of the present embodiment stores image data in the JPEG file format, which is obtained by compressing YCbCr data, as its image data GD. At present, RGB data is generally used in image processing in a personal computer PC or in a printer. It is thus required to extend (decode) the image data in the JPEG file format and to perform the color conversion processing from YCbCr data to RGB data. The matrix S is generally used in JFIF format, which defines specifications regarding JPEG files, to convert YCbCr data into RGB data, and is wellknown to those skilled in the art. The matrix S is thus not described in detail herein.

The CPU 231 then uses a reference value to execute image quality adjustment processing for RGB data that was obtained from the conversion (step S120). The image quality adjustment processing that uses a reference value is generally a type of image processing referred to as automatic image quality adjustment processing, and is a type of processing that uses a preferable standard parameter value (a reference value) previously stored in the ROM 232 to adjust image quality, without relying on any external input. The parameter that is used in such an image quality adjustment is a parameter regarding image quality such as brightness value or sharpness, for example. The standard parameter value regarding such a parameter is used to obtain the correction amount to be corrected, which is then applied to adjust the image quality. Details of the processing will be described later with reference to FIG. 7.

The CPU 231 executes color conversion processing that converts image data (RGB data), which has undergone the automatic image quality adjustment processing, into CMYK data (step S130). In other words, the processing converts the color system of the image data into a CMYK color system, which is used by the color printer 20 in the process of executing print processing. Specifically, the processing is executed with the use of a look-up table, which is stored in the ROM 232 and coordinates a RGB color system and a CMYK color system.

After the aforementioned image processing is complete, the CPU 231 uses the obtained image data to execute print output processing (step S140), and ends the processing routine. In the print output processing, the CPU 231 executes halftone processing and resolution conversion processing, and transmits the processed data to the print unit 21 as raster data.

Details of the automatic image quality adjustment processing will now be described with reference to FIG. 7. The control circuit 231 executes the analysis of image data (step S200). In other words, the automatic image quality adjustment processing of the present embodiment analyzes the image data GD pixel-by-pixel to obtain various characteristic parameter values or image statistics that indicate characteristics of the image data GD such as a brightness minimum value, a brightness maximum value, a brightness histogram, and a brightness value representative value, for example. Since the image data GD is RGB data at this point, a brightness histogram, a brightness minimum value Y min, a brightness maximum value Y max, and so forth are obtained with the use of an expression: $Y=0.30R+0.59G+0.11B$.

The CPU 231 obtains a contrast standard deviation C str from the obtained brightness histogram, and uses the following expression (1) with the obtained contrast standard deviation C str and a contrast standard deviation reference value C ref to calculate an original contrast correction amount tCurve_cont_orig (the contrast correction amount not in consideration of the exposure correction amount) (step S210). The contrast standard deviation reference value C ref may be a fixed value, or may be variable according to a brightness difference that will be described later.

$$tCurve\_cont\_org = \sqrt{|Cref - Csrc|} \qquad \text{(Expression 1)}$$

The CPU 231 uses the following expression (2) to calculate an original brightness value correction amount (a brightness value correction amount not in consideration of the exposure correction amount) tCurve_Yorg (step S220).

$$tCurve\_Y_{ORG} = 2*\sqrt{B_{ref} - B_{smp}} \qquad \text{(Expression 2)}$$

For example, in the case where a brightness value reference value B ref=128 and a bright value representative value that was obtained from a sampling (an analysis) B smp=56, then tCurve_Yorg=16 (see FIG. 8). The brightness reference value B ref is a piece of 8-bit information that may be in the range of 0 to 255, for example, and is set to 128 in the present embodiment.

The CPU 231 determines whether or not the photo information PI (Exif IFD) is included in the image data GF (step S230), and in the case where the photo information PI was determined to be included (step S230: Yes), the CPU 231 calculates a modified contrast correction value tCurve_cont in consideration of the exposure correction amount (the exposure amount) EV (step S240). The modified contrast correction amount tCurve_cont is calculated with the following expression (3).

$$tCurve\_cont = \alpha * tCurve\_cont\_org \qquad \text{(Expression 3)}$$

In expression (3), a is a coefficient for reflecting the exposure correction amount EV on the original contrast correction amount tCurve_cont_org, and is determined according to the map in FIG. 9, in response to the exposure correction amount. To briefly describe the map in FIG. 9, in the case where the exposure correction amount is a positive value, the contrast correction coefficient a gets smaller as the exposure correction amount is increased, which modifies the contrast correction amount so that it is smaller. On the other hand, in the case where the exposure correction amount is a negative value, the contrast correction coefficient gets larger as the absolute value of the exposure correction amount is increased, which modifies the contrast correction amount so that it is larger. It should be noted, however, that the terms "contrast correction coefficient a is small" and "contrast correction amount is modified to be smaller" used in this specification include the cases where "contrast correction coefficient a=0" and "contrast correction amount=0", respectively.

The CPU 231 calculates the brightness difference ? Y=Y mod−Y org between a brightness value at the 128th point of the original image data (the image data before the application of the contrast correction amount) and a brightness value Y mod at the 128th point of the image data that is applied with the modified contrast correction amount tCurve_cont (step S250). The brightness value Y mod is a value that can be obtained from a calculation based on the modified contrast correction amount tCurve_cont, and at this point in time, the modified contrast correction amount tCurve_cont is not yet applied to the image data. The 128th point is one of the abscissa (input value) points of a tone curve where the input values of the image data (the original image data) are plotted on its abscissa and the output values of the image data (the image data after being corrected) are plotted on its ordinate. Although a level correction is executed after the conversion into RGB data in the present embodiment, this processing may also be executed at the stage of YCbCr data with the use of a brightness component Y.

The CPU 231 calculates a modified brightness value correction amount tCurve_Y in consideration of the exposure correction amount (exposure amount) EV (step S260). The modified brightness value correction amount tCurve_Y is calculated with the following expression 4.

$$tCurve\_Y = \frac{tCurve\_Y_{ORG}}{2^{|EV|}} + \Delta Y \qquad \text{(Expression 4)}$$

In expression (4), the brightness difference ? Y is a correction term for compensating for the effect on the brightness value of the image data GD that arises from the contrast (level) correction. In the case where the brightness difference ?Y and the exposure correction amount EV have different signs, the modified brightness value correction amount tCurve_Y is calculated on the assumption that the brightness difference ?Y=0. In such a case, the intention of a photographer regarding the exposure and the direction of the automatic correction conflict with each other. The compensation value that arises from the contrast correction is thus not applied, so as to give priority to the intention of the photographer.

The CPU 231 applies the obtained modified contrast correction amount tCurve_cont and the modified brightness value correction amount tCurve_Y to the tone curve, executes an image quality adjustment that includes the contrast and the bright value (step S270), and ends the processing routine. In other words, the characteristics of the tone curve are modified by the use of the modified contrast correction amount tCurve_cont and the modified brightness value correction amount tCurve_Y, and the output values (output levels) of each component R, G, and B of the image data GD are corrected (varied) pixel-per-pixel by the use of the modified tone curve.

In the case where no photo information PI is determined to be included (step S230: No), the CPU 231 calculates the brightness difference ?Y=Y mod−Y org between a brightness value at the 128 point of the original image data (the image data before the application of the contrast correction amount) and a brightness value Y mod at the 128 point of the image data that is applied with an original contrast correction amount tCurve_cont_org (step S280). The brightness value Y mod is a value that can be obtained from a calculation based on the original contrast correction amount tCurve_cont_org, and at this point in time, the original contrast correction amount tCurve_cont_org is not yet applied to the image data.

In the case where no photo information PI is included, the exposure correction amount (the light exposure) EV cannot be taken into consideration. The CPU 231 thus applies the original contrast correction amount tCurve_cont_org and bright value correction amount tCurve_Yorg to the tone curve, executes an image quality adjustment that includes the contrast and the bright value (step S290), and ends the processing routine.

Figure 10:
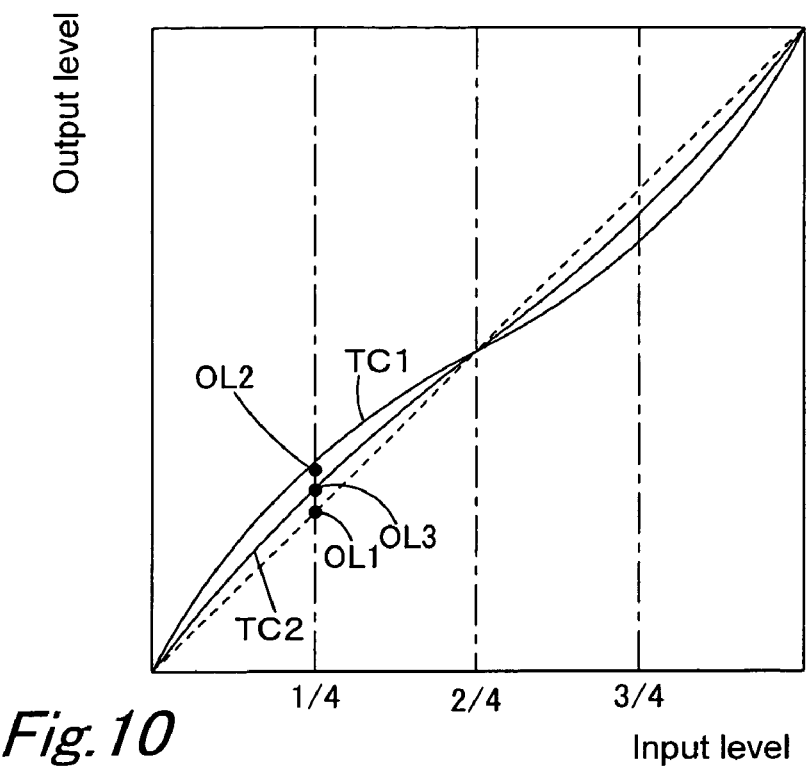
FIG. 10 is a schematic that shows an example of the modification of a tone curve in a contrast correction and a brightness value correction.
Figure 11:
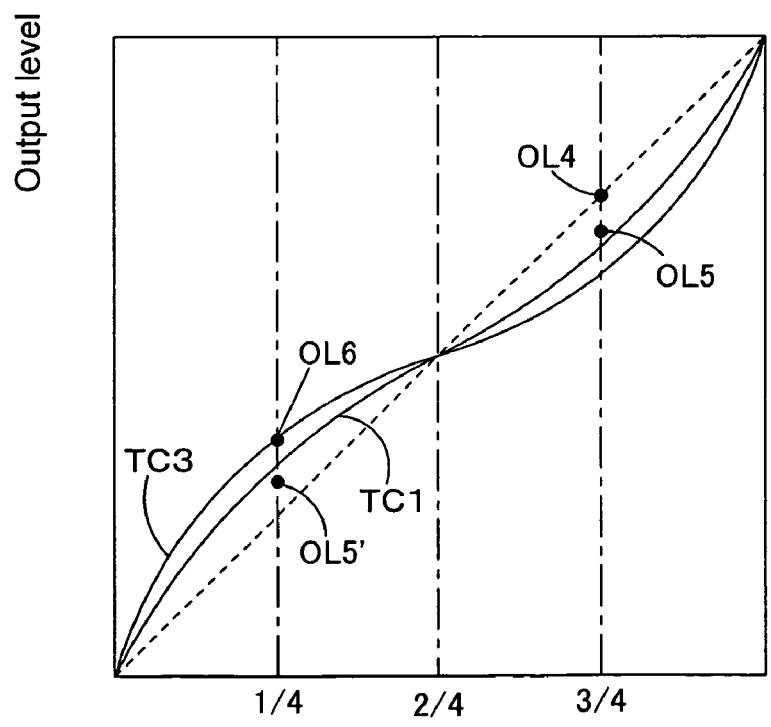
FIG. 11 is a schematic that shows an example of the modification of a tone curve in a contrast correction and a brightness value correction.

The modifications of the tone curve characteristics, each with the modified contrast correction amount tCurve_con and the modified brightness value correction amount tCurve_Y or with the original contrast correction amount value tCurve_cont_org and the original brightness value correction amount tCurve_Yorg, are executed as shown in FIG. 10 and FIG. 11, for example. FIG. 10 is a schematic that shows an example of a tone curve modification in a contrast correction and a brightness value correction, where TC1 indicates a tone curve of a contrast and a brightness value correction in a conventional process, and TC2 indicates a tone curve of a contrast and a brightness value correction in the present embodiment in the case where an exposure correction amount EV is a positive value. FIG. 11 is a schematic that shows an example of a tone curve modification in a contrast correction and a brightness value correction, where TC1 indicates a tone curve of a contrast and a brightness value correction in a conventional process, and TC3 indicates a tone curve of a contrast and a bright value correction in the present embodiment in the case where an exposure correction amount EV is a negative value.

In the case where the exposure correction amount EV is a positive value, i.e., in the case where a photographer requires the brightness value to be corrected so that it is brighter, the object is often a close-up view image such as a portrait. Accordingly, it is the correction to weaken the contrast or the correction to brighten the brightness value that conforms to the intention of the photographer for the contrast or the brightness value, respectively. For example, as shown in FIG. 10, the output level is raised from OL1 to OL2 in response to the modified brightness value correction amount and is lowered from OL2 to OL3 in response to the modified contrast correction amount, at the point of ¼ input level. That is to say, the output level OL3 is the eventual output level that reflects the modified contrast correction amount and the modified brightness value correction amount. Values at the points not corresponding to the correction level are interpolated by a spline curve, which eventually obtains a tone curve TC2.

On the other hand, in the case where the exposure correction amount is a negative value, i.e., in the case where the photographer requires the brightness value to be corrected so that it is darker, the object is often a distant view image such as scenery. Accordingly, it is the correction to strengthen the contrast or the correction to darken the brightness value that conforms to the intention of the photographer for the contrast or the brightness value, respectively. For example, as shown in FIG. 11, the output level is lowered from OL4 to OL5 in response to the modified brightness value correction amount at the point of ¾ input level and is raised from OL5' to OL6 in response to the modified contrast correction amount at the point of ¼ input level. That is to say, the output level OL6 is the eventual output level that reflects the modified contrast correction amount and the modified brightness value correction amount. Values at the points not corresponding to the correction level are interpolated by a spline curve, which eventually obtains a tone curve TC3.

The brightness value correction amount obtained by the color printer 20 of the present embodiment and the brightness value correction amount obtained by the conventional technique are compared as shown in FIG. 8. It should be noted that the conventional brightness value correction technique is a technique to obtain a brightness value correction amount by modifying a brightness value reference value B ref in response to an exposure correction amount EV, as in the aforementioned expression (1). For example, in the case where the standard value of the brightness value reference value B ref is 128, the brightness value reference value B ref is modified by adding a value that was calculated from a reduction expression of 0.1 EV=2 (brightness value modification value) to the brightness value standard value 128. In other words, B ref=standard value+(2*exposure correction amount EV/0.1), where the brightness value modification value is added to the standard value in the case where the exposure correction amount EV is positive and the brightness value modification value is subtracted from the standard value in the case where the exposure correction amount EV is negative.

For example, in the case where the brightness value representative value B smp=56 and the exposure correction amount EV=−1.0, the brightness value reference value B ref is modified from 128 to 108, and the brightness value correction amount that was calculated with the use of the modified brightness value reference value is 14. Additionally, in the case where the brightness value representative value B smp=56 and the exposure correction amount EV=−2.0, the brightness value reference value B ref is modified from 128 to 88, and the brightness value correction amount that was calculated with the use of the modified brightness value reference value is 11.

On the other hand, according to the color printer 20 of the present embodiment, the modified brightness value correction amount=8 when the brightness difference ? Y=+5, the brightness value representative value B smp=56, and the exposure correction amount EV=−1.0 are applied to the expression (2), respectively. Additionally, the modified brightness value correction amount tCurve_Y=4 when the brightness difference ? Y=+5, the brightness value representative value B smp=56, and the exposure correction amount EV=−2.0 are applied to the expression (2), respectively.

Therefore, according to the color printer 20 (image processing device) of the present embodiment, the contrast and the brightness value of the image data GD can be automatically adjusted by reflecting the photo information PI that is included in the image file GF. Accordingly, in the case where the output tendency of the image is intentionally set by a user, the image adjustment by the automatic image quality adjustment processing is suppressed, so that the automatic image quality adjustment can be executed by reflecting the intention of the user.

In particular, according to the color printer 20 of the present embodiment, the contrast correction amount is determined in consideration of the exposure correction amount EV, so that the contrast correction can be executed as intended by the photographer. In other words, in the case where the exposure correction amount is a positive value, the contrast correction amount is modified to be smaller as the exposure correction amount is increased, and in the case where the exposure amount is a negative value, the contrast correction amount is modified to be larger as the absolute value of the exposure correction amount is increased. It is thus possible to execute the contrast correction as appropriate for each of a close-up view image and a distant view image, where the exposure correction amount is set to be a positive value and a negative value, respectively, so that an output image that reflects the intention of the user can be obtained.

Additionally, according to the color printer 20 of the present embodiment, the brightness value correction amount is corrected by dividing the brightness value correction amount that is not in consideration of the exposure correction amount EV into one-$2^{|EV|}$th, so that the brightness value correction can be executed more as intended by the photographer in comparison with the brightness value correction that is executed by the conventional technique. That is to say, it is possible to decrease the modified brightness value correction amount tCurve_Y in geometric progression (exponentially) as the absolute value of the exposure correction amount is increased. It is thus possible to reflect the intention of a photographer, such as to brighten or darken the output result, more accurately onto the output result of image data.

Furthermore, according to the color printer 20 of the present embodiment, the brightness value correction amount is corrected (modified) in consideration of the brightness difference ? Y before and after the contrast correction (level correction), which makes it possible to compensate for the effect on the brightness value arising from the contrast correction. It is therefore possible to execute the bright value correction as intended by the photographer, even in the case where the contrast correction has been executed.

Furthermore, according to the color printer 20 of the present embodiment, the brightness value correction amount is corrected (modified) in consideration of the brightness difference ? Y before and after the contrast correction (level correction), which makes it possible to compensate for the effect on the brightness value arising from the contrast correction. It is therefore possible to execute the brightness value correction as intended by the photographer, even in the case where the contrast correction has been executed.

Additionally, since the image quality can be adjusted automatically with the use of photo information PI included in the image file GF, it is possible to obtain a high quality printing result that readily reflects the intention of the user, without performing the image quality adjustment on a photo retouch application or on a printer driver.

Although an image processing device of the present invention was described with respect to an embodiment, it should be noted that the aforementioned embodiment is for making the present invention easy to understand, and is not to be used to limit the present invention. It is obvious that the present invention can be varied or improved without departing from the scope of the appended claims and equivalents thereof.

Figure 12:
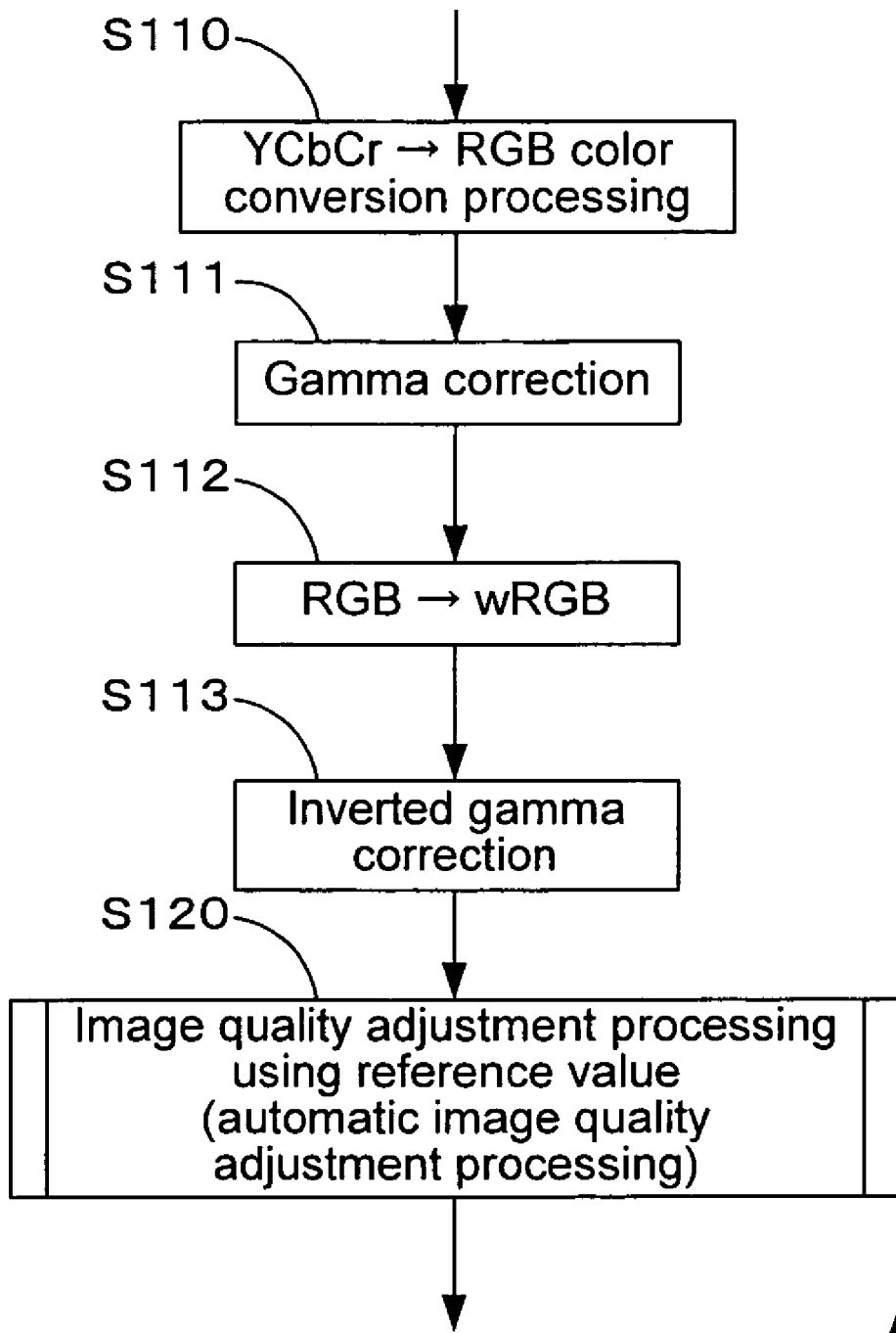
FIG. 12 is a flowchart that shows the processing routine of image processing that may be used in other embodiments.

Other Embodiments:

Although the image quality adjustment processing that uses a reference value is executed after the YCbCr—RGB color conversion processing in the image processing of the aforementioned embodiment, further image processing may also be added as shown in FIG. 12. FIG. 12 is a flowchart that shows the processing routine of image processing, which may be used in another embodiment. It should be noted that the steps before the YCbCr—RGB color conversion processing (step S110) and the steps after the image quality adjustment processing that uses a reference value (step S120) are described already and thus are not mentioned again.

Previous to the subsequent color conversion processing, the CPU 231 executes a gamma correction onto the image data that was converted into RGB data, so as to linearize the image data (step S111). The gamma that is used in the gamma correction is a value that is specific to digital still cameras, and may be obtained based on the parameters of the photo information PI, or may be provided separately from the photo information PI as image processing information associated with the image data GD.

The CPU 231 uses a matrix and executes color conversion processing that converts RGB data into wRGB data (step S112). It should be noted that wRGB color space is a color space that is wider than the commonly-used sRGB color space, and at least a part of it preferably includes a wide region that contains the sRGB color space. With the use of such a wide RGB color space, it is possible to relay the process to the subsequent automatic image quality adjustment processing without losing the RGB data that was obtained from the conversion from the YCbCr data. The matrix to be used herein may be a matrix that is obtained by combining, e.g., a matrix M for converting RGB data into XYZ data with, e.g., a matrix N for converting wRGB data into XYZ data, such as a matrix $N^{-1}M$, or may be a matrix M and a matrix $N^{-1}$.

The CPU 231 executes an inverted gamma correction onto the image data that was converted into wRGB data (step S113). The gamma to be used for the inverted gamma correction is a gamma that is specific to the color printer 20, and is previously stored in the ROM 232, for example. By executing such an inverted gamma correction, it is possible to generate image data GD in consideration of the gamma characteristic of the color printer 20.

The CPU 231 then executes the already described automatic image quality adjustment processing (step S120) and the successive steps in a sequential order. According to the present embodiment, the automatic image quality adjustment processing can be executed without losing the RGB data that was converted from the YCbCr data, which makes it possible to execute the image quality adjustment processing more appropriately.

Although the above embodiment was described with respect to an example where the image quality adjustment processing of the brightness value is executed based on a single reference value automatically, the brightness value reference value B ref and the brightness value correction amount may be also be modified in response to the tendency of the brightness value correction that was selected with an image quality automatic adjustment button, which is provided on the operation panel of the color printer 20 to select the tendency of the brightness value correction such as brighter or darker, for example.

Although the above embodiment is described with respect to an example where the image quality adjustment processing is executed automatically, it is also possible to provide an image quality automatic adjustment button on the operation panel of the color printer 20, and to execute the image quality automatic adjustment processing of the aforementioned embodiment only in the case where an image quality automatic adjustment that is selected with the image quality automatic adjustment button is being selected.

Although in the aforementioned embodiment, all of the image processing is executed in the color printer 20 without the personal computer PC, and dot patterns are formed on a printing medium according to the image data GD thus generated, all of or a part of the image processing may also be executed on the computer. It is achieved by endowing an image data processing application such as a retouch application or a printer driver that is installed on, e.g., a hard disk of the computer, with the image processing function that was described above with reference to FIG. 6 through FIG. 8. The image file GF that was generated in the digital still camera 12 is provided to the computer via a cable or via a memory card MC. On the computer, the application is started by user operations to execute the reading of the image file GF, the analysis of the photo information PI, and the conversion and the adjustment of the image data GD. Alternatively, the application may be automatically started by detecting the insertion of a memory card MC or by detecting the insertion of a cable, to automatically execute the reading of the image file GF, the analysis of the photo information PI, and the conversion and the adjustment of the image data GD.

Furthermore, all of or a part of the image processing that is executed on the personal computer PC may alternatively be executed on the digital still camera 12. It is achieved by endowing an image data processing application such as a retouch application or a printer driver that is installed on, e.g., a ROM of the digital still camera 12, with the image processing function that was described above with reference to FIG. 6 through FIG. 8. The data for printing, which includes a print control command and image data for printing what was generated in the digital still camera 12, is provided to the printer 20 via a cable or via a memory card MC. The printer 20 that received the data for printing forms dot patterns on a printing medium and outputs an image according to the image data for printing. The digital still camera 12 may also provide the image data for printing (the image processed image data) to the personal computer PC or to the printer 20. In such a case, the print control command is provided to the image data for printing in the personal computer PC or in the printer 20.

Although in the above embodiment, the automatic adjustment of image quality was described with respect to the brightness value correction in consideration of the exposure correction amount, the automatic adjustment of image quality that reflects the photo information PI may also be executed for other characteristic parameter values of the image data GD, such as shadow-contrast point, contrast, color balance, saturation, and sharpness.

Furthermore, it is also possible to select the characteristic parameter value for which the automatic adjustment of image quality is executed. For example, the color printer 20 may be provided with a select button for selecting a parameter or a select button for selecting a photo mode parameter that was obtained by combining given parameters according to the object, and the parameter for which the automatic adjustment of image quality is executed may be selected with these select buttons. Additionally, in the case where the automatic adjustment of image quality is executed on a personal computer, the parameter for which the automatic adjustment of image quality is executed may be selected on the user interface of a printer driver or of a retouch application.

Although the color printer 20 is used as the output device in both of the aforementioned embodiments, other display devices such as a CRT, a LCD, and a projector may also be used as the output device. In such a case, the display device as the output device executes an image processing program (a display driver) that executes image processing described with reference to FIGS. 6 through 8 Alternatively, in the case where, e.g., a CRT functions as the display device of a computer, the image processing program is executed on the computer's side. It should be noted, however, that the image data that is output at the end has a RGB color space rather than a CMYK color space.

In such a case, the photo information PI at the generation of image data can be reflected onto the display result that was obtained in the display device such as a CRT, just like the information at the generation of image data can be reflected onto the print result that was obtained via the color printer 20. It is thus possible to display with more accuracy the image data GD that was generated by the digital still camera 12.

Although an Exif format file was used as a specific example of the image file GF in the above embodiments, the image file of the present invention is not restricted to this format. In other words, the image file may be any type as long as the image data GD and information regarding exposure correction associated with the image data GD are included therein. Furthermore, the information regarding exposure correction may be the photo information PI of the image data or may be the image processing control information for controlling the image processing device in a more aggressive way. In should be noted, however, that the parameter stored as the photo information PI, which was used in the above embodiments and is illustrated in FIG. 8, is for illustrative purposes only, and various parameters may also be stored as long as it conforms to the Exif standards.

The digital still camera 12 and the color printer 20 that were used in the above embodiments are for illustrative purposes only, and their structures are not restricted to the ones that were disclosed in each embodiment. As for the digital still camera 12, it is required only to have a function to generate an image file GF of the aforementioned embodiments. As for the color printer 20, it is required only to analyze the photo information PI of the image file GF of the present embodiment, to adjust the image quality automatically, especially the brightness value, by reflecting the intention of the user, and to output (print) an image.

Although in the aforementioned embodiment, the brightness value correction amount is decreased in geometric progression as the exposure correction amount is increased, the degree of variation of the brightness value correction amount when the exposure correction amount is less than a given exposure correction amount may be differentiated from the degree of variation of the brightness value correction amount when the exposure correction amount is equal to or more than the given exposure correction amount. Alternatively, the rate of reduction of the brightness value correction amount may be reduced as the exposure correction amount is increased. In such a case, gradations in highlight areas or shadow areas can be maintained irrespective of the increase in the exposure correction amount, so that white skipping or black crushing can be prevented.

Although the aforementioned embodiments were described with respect to the case where the image data GD and the photo information PI are included in the same image file GD, the image data GD and the photo information PI are not necessarily stored in the same file. In other words, the image data GD and the photo information PI (image processing control information) are not necessarily stored in the same file as long as they are associated with one another. For example, association data that associates the image data GD and the photo information PI (image processing control information) may be generated and one or more image data GD and its photo information PI may be stored in separate files, respectively, so that the associated photo information PI may be referred to at the point of processing the image data GD. This is because in such a case, the image data and the photo information PI are in a unified, inseparable relationship at the point of image processing based on the photo information PI, and function as substantially the same as in case where they are stored in one file. Furthermore, dynamic image files that are stored in optical disk media such as CD-ROM, CD-R, DVD-ROM, and DVD-RAM are also included in the image file GF of the present embodiment.

What is claimed is:

1. An image processing method for image data that uses image data and an exposure correction amount for the image data, said image processing method comprising:
    determining a brightness value correction amount of said image data by using a brightness value reference value, which is to become a criterion for an image quality adjustment regarding brightness value;
    determining a contrast correction amount of said image data by using a contrast reference value, which is to become a criterion for an image quality adjustment regarding contrast;
    modifying said brightness value correction amount to be smaller as said exposure correction amount is increased;
    in a case where said exposure correction amount is a positive correction amount, modifying said contrast correction amount to be smaller as said exposure correction amount is increased;
    adjusting a brightness value and a contrast of said image data by applying said modified brightness correction amount and contrast correction amount; and
    outputting an image based on said brightness value-adjusted and contrast-adjusted image data.

2. An image processing method according to claim 1, wherein
    in a case where said exposure correction amount is a negative correction amount, modifying said contrast correction amount to be larger as the absolute value of said exposure correction amount is increased; and
    said brightness value correction amount is modified smaller in geometric progression.

3. An image processing method according to claim 1 or 2, wherein
    the modification of said brightness value correction amount is executed by differentiating a degree of variation of said brightness value correction amount in a case where said exposure correction amount is less than a given exposure correction amount, from a degree of variation of said brightness value correction amount in a case where said exposure correction amount is equal to or more than said given exposure correction amount.

4. An image processing method according to claim 1 or 2, wherein
    the modification of said brightness value correction amount is executed by decreasing the rate of reduction of said brightness value correction amount as said exposure correction amount is increased.

5. An image processing method according to claim 4, wherein
    the modification of said brightness value correction amount is executed by decreasing said bright value correction amount in geometric progression as said exposure correction amount is increased.

6. An image processing method according to claim 1, wherein
    the modification of said contrast correction amount is executed by multiplying a square root of said contrast correction amount by a coefficient that has said exposure correction amount as its parameter.

7. An image processing method according to claim 6, further comprising:
    analyzing said image data to obtain a contrast characteristic value that indicates a characteristic regarding the contrast of said image data;
    wherein the determination of said contrast correction amount is executed in a way to reduce a deviation between said contrast reference value and said obtained contrast characteristic value.

8. An image processing method according to claim 1, further comprising:
    analyzing said image data to obtain a brightness value characteristic value that indicates a characteristic regarding a brightness value of said image data;
    analyzing said image data to obtain a contrast characteristic value that indicates a characteristic regarding the contrast of said image data;
    determining said brightness value correction amount in a way to reduce a deviation between said brightness value reference value and said obtained brightness value characteristic value, and dividing the determined bright value correction amount by an exponential function that has said exposure correction amount as its parameter; and
    determining said contrast correction amount in a way to reduce a deviation between said contrast reference value and said obtained contrast characteristic value, and multiplying a square root of the determined contrast correction amount by a coefficient that has said exposure correction amount as its parameter.

9. An image processing method according to claim 1, further comprising:
    receiving contrast correction information that specifies a tendency of a contrast correction for said image data;
    determining a contrast correction amount of said image data based on said received contrast correction information; and multiplying a square root of said determined contrast correction amount by a coefficient that has said exposure correction amount as its parameter.

10. An image processing device that executes image processing for image data by using image data and an exposure correction amount for the image data, said image processing device comprising:
- a correction amount determination unit that determines a brightness value correction amount and a contrast correction amount of said image data by using a brightness value reference value and a contrast reference value, which are to become a criterion for an image quality adjustment regarding brightness value;
- a brightness value correction amount modification unit that decreases said brightness value correction amount as said exposure correction amount is increased;
- a contrast correction amount modification unit that, in a case where said exposure correction amount is a positive correction amount, reduces said contrast correction amount as said exposure correction amount is increased; and
- an image quality adjustment unit that adjusts a brightness value of said image data by applying said modified brightness value correction amount and adjusts the contrast of said image data by applying said modified contrast correction amount.

11. A computer readable medium having encoded thereon a computer program including a set of computer instructions for causing a computer to implement a method for contrast and brightness correction of image data, said computer program comprising:
- a computer instruction that determines a brightness value correction amount of said image data by using a brightness value reference value, which is to become a criterion for an image quality adjustment regarding brightness value;
- a computer instruction that determines a contrast correction amount of said image data by using a contrast reference value, which is to become a criterion for an image quality adjustment regarding contrast;
- a computer instruction that modifies said brightness value correction amount to be smaller as said exposure correction amount is increased;
- a computer instruction that, in a case where said exposure correction amount is a positive correction amount, modifies said contrast correction amount to be smaller as said exposure correction amount is increased; and
- a computer instruction that adjusts a brightness value and a contrast of said image data by applying said modified brightness correction amount and contrast correction amount.

12. An image output method that outputs an image based on image data that has undergone image processing using an exposure correction amount, said image output method comprising:
- determining a brightness value correction amount and a contrast correction amount of said image data by using a brightness value reference value and a contrast reference value, which are to become a criterion for an image quality adjustment regarding brightness value;
- modifying said brightness value correction amount to be smaller as said exposure correction amount is increased;
- in a case where said exposure correction amount is a positive correction amount, modifying said contrast correction amount in a way to reduce said contrast correction amount as said exposure correction amount is increased;
- adjusting a brightness value of said image data by applying said modified bright value correction amount, as well as adjusting a contrast of said image data by applying said modified contrast correction amount; and
- outputting an image based on said brightness value-adjusted and contrast-adjusted image data.

13. An image processing method according to claim 12, wherein
- in a case where said exposure correction amount is a negative correction amount, the modification of said contrast correction amount is executed by increasing said contrast correction amount as an absolute value of said exposure correction amount is increased.

14. An image output device that outputs an image based on image data that has undergone image processing using an exposure correction amount, said image output device comprising:
- a correction amount determination unit that determines a brightness value correction amount and a contrast correction amount of said image data by using a brightness value reference value and a contrast reference value, which are to become a criterion for an image quality adjustment regarding brightness value;
- a brightness value correction amount modification unit that decreases said brightness value correction amount as said exposure correction amount is increased;
- a contrast correction amount modification unit that, in a case where said exposure correction amount is a positive correction amount, reduces said contrast correction amount as said exposure correction amount is increased;
- an image quality adjustment unit that adjusts a brightness value of said image data by applying said modified brightness value correction amount and adjusts a contrast of said image data by applying said modified contrast correction amount; and
- an image output unit that outputs an image based on said brightness value-adjusted and contrast-adjusted image data.

15. A computer readable medium having encoded thereon a computer program including a set of computer instructions for causing a computer to implement a metod for outputting an image based on image data that has undergone image processing using an exposure correction amount, said computer program comprising:
- a computer instruction that determines a brightness value correction amount and a contrast correction amount of said image data by using a brightness value reference value and a contrast reference value, which are to become a criterion for an image quality adjustment regarding brightness value;
- a computer instruction that modifies said brightness value correction amount to be smaller as said exposure correction amount is increased;
- a computer instruction that, in a case where said exposure correction amount is a positive correction amount, modifies said contrast correction amount in a way to reduce said contrast correction amount as said exposure correction amount is increased;
- a computer instruction that adjusts a brightness value of said image data by applying said modified brightness value correction amount and adjusts a contrast of said image data by applying said modified contrast correction amount; and a computer instruction that outputs an image based on said brightness value-adjusted and contrast-adjusted image data.

16. An image processing method that executes image processing for image data by using image data and information of an exposure correction executed for the image data, said image processing method comprising:
    analyzing said image data to obtain a brightness value characteristic value that indicates a characteristic regarding brightness value of said image data;
    analyzing said image data to obtain a contrast characteristic value that indicates a characteristic regarding contrast of said image data;
    reducing a deviation between a brightness value reference value, which is to become a criterion for an image quality adjustment regarding brightness value, and said obtained brightness value characteristic value;
    reducing a deviation between a contrast reference value, which is to become a criterion for an image quality adjustment regarding contrast, and said obtained contrast characteristic value;
    based on said exposure correction information, adjusting a degree of reduction of said deviation regarding brightness value as a level of an exposure correction executed for said image data is increased; and
    based on said exposure correction information, adjusting a degree of reduction of said deviation regarding contrast as a level of a positively-headed exposure correction executed for said image data is increased.

17. An image processing method according to claim 16, wherein
    the adjustment of said contrast deviation reduction amount is executed based on said exposure correction information, by increasing the degree of reduction of said deviation regarding contrast as an absolute level of a negatively-headed exposure correction executed for said image data is increased.

18. An image processing device that executes image processing for image data by using image data and information of an exposure correction executed for the image data, said image processing device comprising:
    a brightness value characteristic value obtaining unit that analyzes said image data to obtain a brightness value characteristic value that indicates a characteristic regarding brightness value of said image data;
    a contrast characteristic value obtaining unit that analyzes said image data to obtain a contrast characteristic value that indicates a characteristic regarding contrast of said image data;
    a brightness value adjustment unit that reduces a deviation between a brightness value reference value, which is to become a criterion for an image quality adjustment regarding brightness value, and said obtained brightness value characteristic value;
    a contrast adjustment unit that reduces a deviation between a contrast reference value, which is to become a criterion for an image quality adjustment regarding contrast, and said obtained contrast characteristic value;
    a brightness value deviation reduction amount adjustment unit that, based on said exposure correction information, reduces a degree of reduction of said deviation regarding brightness value as a level of an exposure correction executed for said image data is increased; and
    a contrast deviation reduction amount adjustment unit that, based on said exposure correction information, reduces a degree of reduction of said deviation regarding contrast as a level of a positively-headed exposure correction executed for said image data is increased.

19. A computer readable medium having encoded thereon a computer program including a set of program instructions for causing a computer to implement image processing with the use of image data and an exposure correction amount for the image data, said computer program comprising:
    a program instruction that determines a brightness value correction amount of said image data by using a brightness value reference value, which is to become a criterion for an image quality adjustment regarding brightness value;
    a program instruction that determines a contrast correction amount of said image data by using a contrast reference value, which is to become a criterion for an image quality adjustment regarding contrast;
    a program instruction that modifies said brightness value correction amount to be smaller as said exposure correction amount is increased;
    a program instruction that, in a case where said exposure correction amount is a positive correction amount, modifies said contrast correction amount to be smaller as said exposure correction amount is increased; and
    a program instruction that adjusts a brightness value and a contrast of said image data by applying said modified brightness correction amount and contrast correction amount.

* * * * *